United States Patent
Wang et al.

(10) Patent No.: US 6,886,060 B2
(45) Date of Patent: Apr. 26, 2005

(54) COMPUTER SYSTEM FOR INTEGRATING CAR ELECTRONIC DEVICES

(75) Inventors: Wei-Jen Wang, Tai Chung (TW); Ping-Hui Shu, Hsin Chu Hsien (TW); Wen-Che Liu, Hsinchuang (TW); Long-Tai Chen, Miao Li (TW); Ya-Wen Wu, Tai Chung Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 17 days.

(21) Appl. No.: 10/392,819

(22) Filed: Mar. 21, 2003

(65) Prior Publication Data

US 2004/0186936 A1 Sep. 23, 2004

(51) Int. Cl.[7] ............................................... G06F 13/00
(52) U.S. Cl. ............................... 710/72; 710/1; 701/1; 701/33; 701/200; 340/933; 180/167; 455/3.01
(58) Field of Search ............................ 701/1–2, 33–41, 701/200; 710/1, 72–74; 367/679–686; 705/1–5; 340/933, 825.49; 370/312, 8; 180/167–179; 455/3.01–3.06

(56) References Cited

U.S. PATENT DOCUMENTS

| | | | |
|---|---|---|---|
| 5,047,614 A | * 9/1991 | Bianco | 235/385 |
| 5,054,569 A | * 10/1991 | Scott et al. | 180/167 |
| 5,250,789 A | * 10/1993 | Johnsen | 705/14 |
| 5,303,393 A | * 4/1994 | Noreen et al. | 455/3.02 |
| 5,351,187 A | * 9/1994 | Hassett | 705/13 |
| 5,424,524 A | * 6/1995 | Ruppert et al. | 705/8 |
| 5,424,727 A | * 6/1995 | Shieh | 340/928 |
| 5,455,823 A | * 10/1995 | Noreen et al. | 370/312 |
| 5,664,231 A | * 9/1997 | Postman et al. | 710/73 |
| 5,689,245 A | * 11/1997 | Noreen et al. | 340/825.49 |
| 5,767,795 A | * 6/1998 | Schaphorst | 340/988 |
| 5,794,164 A | * 8/1998 | Beckert et al. | 455/3.06 |

(Continued)

Primary Examiner—Christopher B. Shin
(74) Attorney, Agent, or Firm—Rabin & Berdo, P.C.

(57) ABSTRACT

A computer system for integrating several car electronic devices is proposed. The computer system is installed in a housing, which is of the standard DIN size to be installed in a car dashboard. A computer host is disposed in the housing, and can run at least an operating system or at least a software program. At least an external electronic device is connected to the computer host through a plurality of connection ports disposed on the computer host. A control panel is disposed at the front end of the housing to control the computer host. A display for displaying text or picture information is also connected to the computer host. A touch panel adhering to the display is also provided. Data can be input through contacting the touch panel. The connection ports can connect all electronic devices in a car for integrating and controlling them.

2 Claims, 5 Drawing Sheets

U.S. PATENT DOCUMENTS

| | | | | |
|---|---|---|---|---|
| 5,794,207 A | * | 8/1998 | Walker et al. | 705/1 |
| 5,837,982 A | * | 11/1998 | Fujioka | 340/10.2 |
| 5,857,201 A | * | 1/1999 | Wright et al. | 707/104.1 |
| 5,859,779 A | * | 1/1999 | Giordano et al. | 700/231 |
| 5,948,040 A | * | 9/1999 | DeLorme et al. | 701/201 |
| 5,949,345 A | * | 9/1999 | Beckert et al. | 340/815.41 |
| 5,955,970 A | * | 9/1999 | Ando et al. | 340/928 |
| 5,959,577 A | * | 9/1999 | Fan et al. | 342/357.13 |
| 5,970,469 A | * | 10/1999 | Scroggie et al. | 705/14 |
| 5,970,474 A | * | 10/1999 | LeRoy et al. | 705/27 |
| 5,977,908 A | * | 11/1999 | Nichols | 342/357.08 |
| 5,979,757 A | * | 11/1999 | Tracy et al. | 235/383 |
| 5,995,898 A | * | 11/1999 | Tuttle | 701/102 |
| 6,009,363 A | * | 12/1999 | Beckert et al. | 701/33 |
| 6,014,634 A | * | 1/2000 | Scroggie et al. | 705/14 |
| 6,101,483 A | * | 8/2000 | Petrovich et al. | 705/26 |
| 6,104,315 A | * | 8/2000 | Volkel et al. | 340/988 |
| 6,111,521 A | * | 8/2000 | Mulder et al. | 340/905 |
| 6,111,539 A | * | 8/2000 | Mannings et al. | 342/357.09 |
| 6,131,067 A | * | 10/2000 | Girerd et al. | 701/213 |
| 6,148,212 A | * | 11/2000 | Park et al. | 455/456.1 |
| 6,154,658 A | * | 11/2000 | Caci | 455/466 |
| 6,163,270 A | * | 12/2000 | Silverman | 340/3.3 |
| 6,169,955 B1 | * | 1/2001 | Fultz | 701/200 |
| 6,199,045 B1 | * | 3/2001 | Giniger et al. | 705/1 |
| 6,202,008 B1 | * | 3/2001 | Beckert et al. | 701/33 |
| 6,233,506 B1 | * | 5/2001 | Obradovich et al. | 701/1 |
| 6,381,133 B1 | * | 4/2002 | Chen | 361/686 |
| 6,490,443 B1 | * | 12/2002 | Freeny, Jr. | 455/406 |
| 6,574,603 B1 | * | 6/2003 | Dickson et al. | 705/1 |
| 6,711,474 B1 | * | 3/2004 | Treyz et al. | 701/1 |

\* cited by examiner

COMPUTER SYSTEM FOR INTEGRATING CAR ELECTRONIC DEVICES

BACKGROUND OF THE INVENTION

1. Field of the Invention

The present invention relates to a computer system for integrating car electronic devices and, more particularly, to a computer system capable of integrating several electronic devices in a car together.

2. Description of the Related Art

A car has several independent electronic devices such as, for example, a car audio system, an anti-theft system, a navigation system, a car diagnosis system, a car backing supplementary system, a mobile phone communication system, and a central air-conditioning system. The car audio system may include a radio, a CD disc player, an environmental equalizer, an amplifier and several speakers. A common car audio system is of the standard Deutsche Industry Normen (DIN) size to ensure compatibility so that it can be installed in any car dashboard.

The safety system usually makes use of various kinds of sensors and micro-controllers arranged on a car to determine activation of safety mechanism. The navigation system has a GPS system and a GPS receiver. The GPS receiver has an antenna to receive signals from a satellite network and obtain the longitude, latitude and altitude of a car. An electronic map is then used to provide positioning and navigational functions for the car.

Because pollution and car mileage problems have gradually accumulated, electronic diagnosis systems (e.g., OBD I and OBD II of U.S.) for analyzing performance of engines, transmission and fuel systems and other components have been installed in high-level cars. In addition to providing pollution and car mileage information, they also utilize instruments to inform drivers of various operation statuses and provide car information for maintenance workers.

The car backing supplementary system can assist a driver in parking the car. At present, it chiefly uses micro-controllers and range finders to detect the distance between the car and rear obstacles, and then provides distance information via sound or light. The mobile communication system is also added to a car so that the driver has voice communication via the hands-free function of mobile phone. A more advanced car mobile phone can further dial or answer a phone by sound control. The central air-conditioning system uses a micro-controller to control the strength of cool air so as to keep an appropriate temperature in the car.

The conventional car contains electronic devices for safety, navigation, communication and multimedia in response to customer demand for increased variety of electronic devices. However, these electronic devices are independent and mutually incompatible. These electronic devices use independent hardware and micro-controllers, and run mutually incompatible special software so that they cannot communicate with each other.

In these self-contained electronic devices, if a user demands several different functions, he needs to purchase different hardware and software modules, and cannot make use of existent devices for software or hardware upgrade. The expansibility is bad, the cost is high, and the volume is bulky.

SUMMARY OF THE INVENTION

The primary object of the present invention is to provide a computer system for integrating several car electronic devices. The computer system is installed in a housing, which is of the standard DIN size to be installed in a car dashboard. A computer host is disposed in the housing, and can run at least an operating system or at least a software program. A plurality of connection ports is disposed in the computer host to connect at least an electronic device. A control panel is disposed at the front end of the housing to control the computer host. The computer host also connects a display for displaying text or picture information. A touch panel adheres to the display. Data can be input through contacting the touch panel. The computer system can thus be installed in a car to provide the function of a single platform system.

The secondary object of the present invention is to provide the above computer system for integrating several car electronic devices, wherein the electronic device connected with the computer host can be an audio device, an anti-theft device, a navigation device, a car status diagnosis device, a car backing supplementary device, a mobile communication device or a central air-conditioning device. All car electronic devices can thus be integrated together.

Another object of the present invention is to provide a communication system for integrating several car electronic devices. The communication system comprises a plurality of wireless electronic devices, a plurality of wired electronic devices and a communication host. Each of the wireless electronic devices has a wireless transmission module. Each of the wired electronic devices has a wired connection interface. The communication host has a wireless network interface and a wired network interface. The wireless network interface can be connected to the wireless electronic devices to form a wireless network. The wired network interface can be connected to the wired electronic devices to form a wired network. The communication host can connect all of the wireless electronic devices and the wired electronic devices via the wireless network and the wired network. An identification (ID) code is set for each of the communication host, the wireless electronic devices and the wired electronic devices for mutual data exchange. The car electronic devices can thus perform compatible data transmission via the wireless or wired network to enhance the effects of expansibility and software and hardware upgrade.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENT

Figure 1:
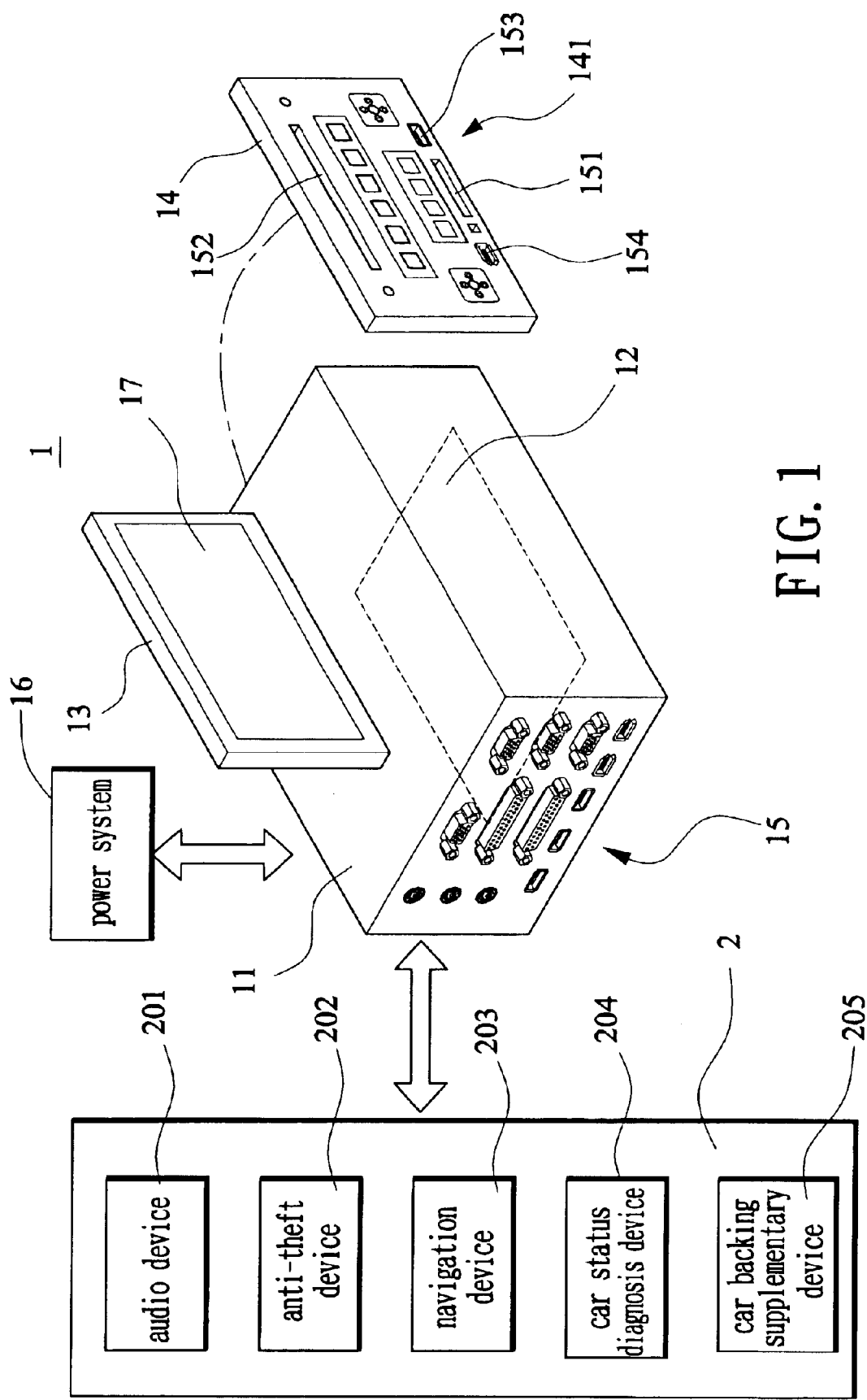
FIG. 1 is an architectural diagram of a computer system of the present invention.

As shown in FIG. 1, the present invention mainly uses a computer system 1 as a platform for integrating, connecting and controlling all car electronic devices 2. The electronic device 2 can be an audio device 201, an anti-theft device 202, a navigation device 203, a car status diagnosis device 204, a car backing supplementary device 205, a mobile communication device or a central air-conditioning device. The audio device 201 can include an AM/FM radio set, a CD player, an amplifier, a sound effect equalizer and at least a speaker. The computer system 1 of the present invention mainly comprises a housing 11, a computer host 12, a display 13, a control panel 14, a plurality of connection ports 15 and a power system 16. The housing 11 is of the standard DIN size and thus can be installed in a car dashboard. The housing 11 can be of 1DIN size or 2DIN size.

The computer host 12 is located in the housing 11. The plurality of connection ports 15 on the computer host 12 protrudes from the rear end backboard of the housing 11 for connection of all the electronic devices 2. The connection ports 15 comprise at least a serial port, at least a parallel port, at least a data communication port, at least a display connection port and at least an audio connection port. The computer host 12, as shown in FIG. 2, at least comprises a bus 20, a central processing unit (CPU) 21, a memory unit 22, a chipset 23 and a storage 24, and can run at least an open-end multitask operating system like Windows CE, Windows XP Embedded or embedded Linux or a plurality of software programs.

The control panel 14 is disposed at the front end of the computer host 12, and has a plurality of keys 141 thereon for controlling the computer host 12. The control panel 14 also has a plurality of slots therein for external storage media. The slots include a memory card slot 151 for insertion of memory card and a CD drive slot 152 for insertion of DVD/CD discs; The control panel 14 has also a plurality of communication ports therein for connecting external electronic devices. The communication ports at least include a USB communication port 153 and an IEEE1394 communication port 154.

The display 13 is connected to one of the connection ports 15 of the computer host 12, and is used to display text or image information of the computer host 12. A touch panel 17 adhering to the display 13 is also provided. The touch panel 17 has an input signal line electrically connected with one of the connection ports 15 of the computer host 12. The computer host 12 can be controlled or data can be input into the computer host 12 through touching an image or text information displayed on the display 13.

Figure 2:
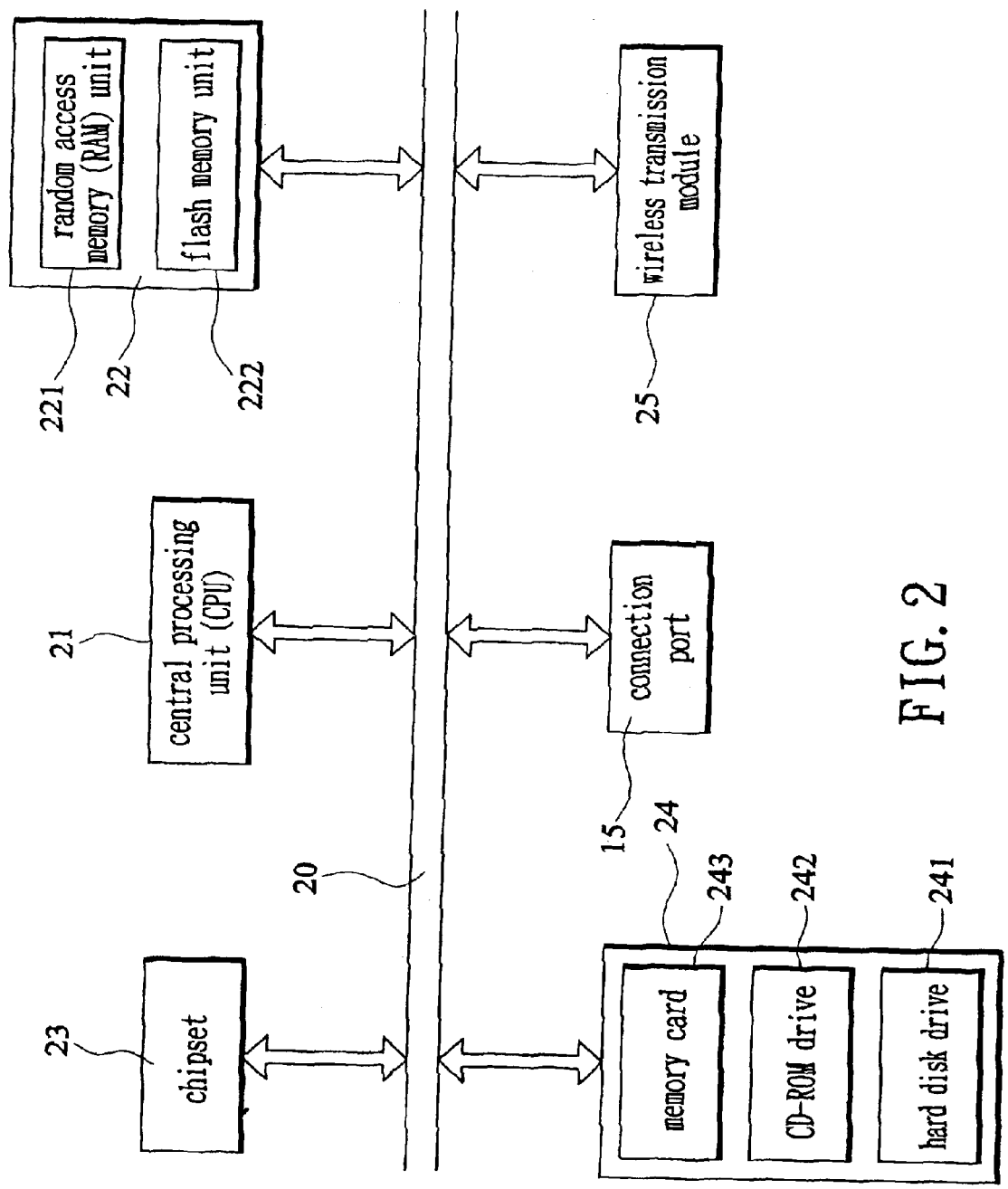
FIG. 2 is a system block diagram of a computer system of the present invention.

As shown in FIG. 2, the bus 20 is electrically connected to the connection ports 15, and can be used to accomplish data exchange between each component in the computer host. 12. The CPU 21 is connected to the bus 20, and is used to run the operating system, a plurality of application programs or a plurality of drivers or for processing, operation or access of data.

The memory unit 22 is connected to the bus 20. There are two kinds of memory unit 22, one being a random access memory (RAM) unit 221, and the other being a flash memory unit 222. The RAM unit 221 is used to store temporarily the operating system, the application programs or the drivers run by the CPU. 22 or the data operated by the CPU 21. The flash memory unit 222 is used to store software like the operating system, the application programs and the drivers.

The chipset 23 is connected to the bus 20, and is responsible for data control, access or exchange between the CPU 21 and the memory unit 22 and the connection ports 15. The storage 24 is a removable storage, and can be a hard disk drive 241, a CD-ROM drive 242 or a memory card 243. The storage 24 can be connected to the bus 20, and can be used to access, upgrade or expand the operating system, application programs and drivers.

The present invention makes use of wireless transmission for data exchange between the computer system 1 and each of the electronic devices 2. A wireless transmission module 25 connected to the bus 20 is disposed in the computer host 12, and can connect at least a wireless electronic device in wireless way. In order to connect and communicate with all the electronic devices in a car in wired and wireless ways, a communication system for integrating several car electronic devices, is also designed in the present invention.

Figure 3:
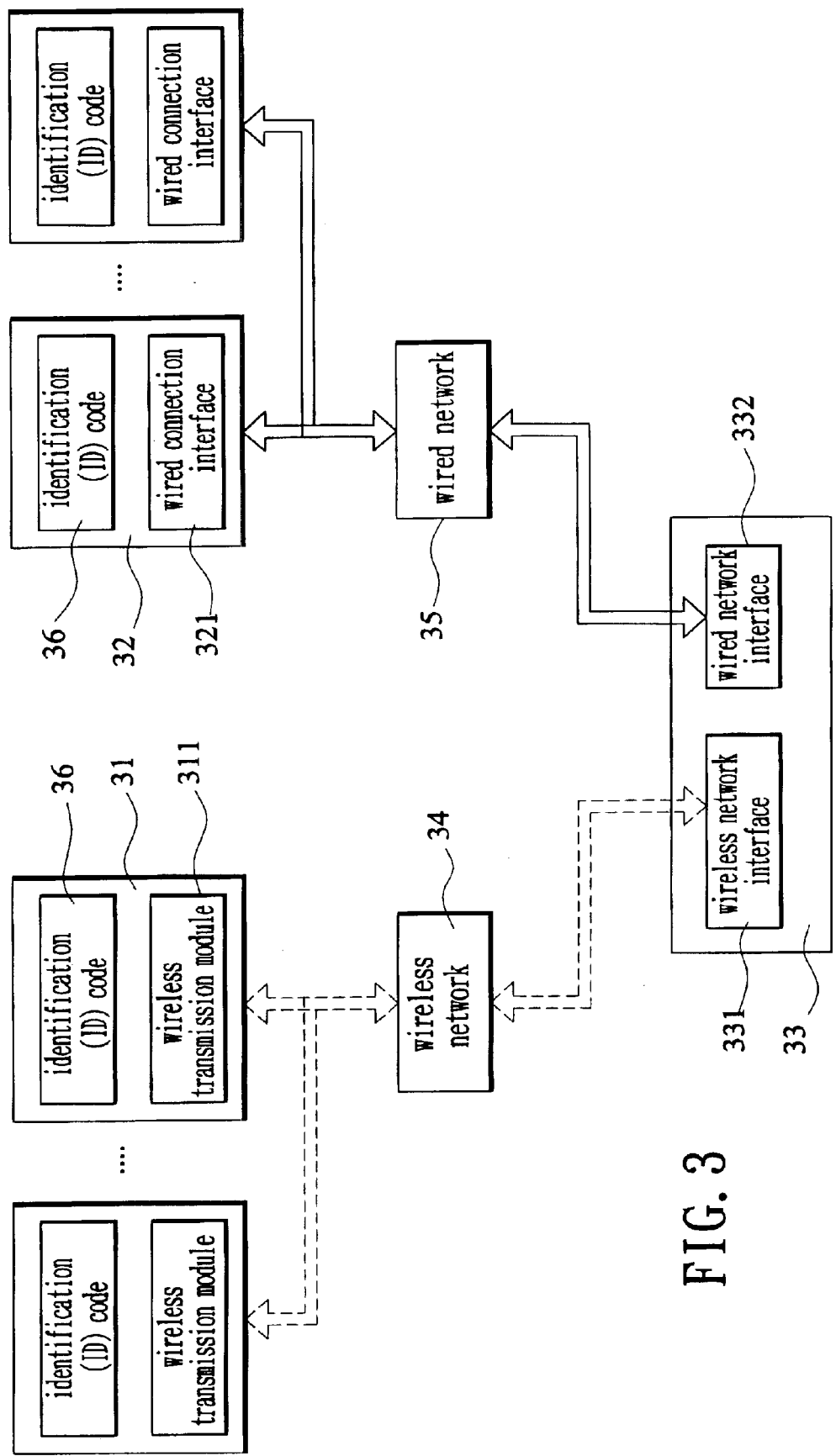
FIG. 3 is an architectural diagram of a communication connection between a computer system and electronic devices of the present invention.

As shown in FIG. 3, the present invention divides all the car electronic devices 2 into a plurality of wireless electronic devices 31 and a plurality of wired electronic devices 32 according to the connection status. Each of the wireless electronic devices 31 has a wireless transmission module 311. Each of the wired electronic devices 32 has a wired transmission module 321. The computer host 12 is used as a communication host 33 for all the electronic devices 2. The communication host 33 has a wireless network interface 331 and a wired network interface 332 therein. The wireless network interfaces 331 can connect the wireless electronic devices 31 to form a wireless network 34. The wired network interfaces 332 can connect the wired electronic devices 32 to form a wired network 35. The communication host 33 can connect all of the wireless electronic devices 31 and the wired electronic devices 32 via the wireless network 34 and the wired network 35 so that mutual data exchange can be accomplished between the communication host 33, the wireless electronic devices 31 and the wired electronic devices 32.

In order that each of the electronic devices 2 can connect and communicate with the communication host 33 and another electronic device 2, an ID code 36 is set for each of the communication host 33 and the electronic devices 2 for mutual data transmission between them.

Figure 4:
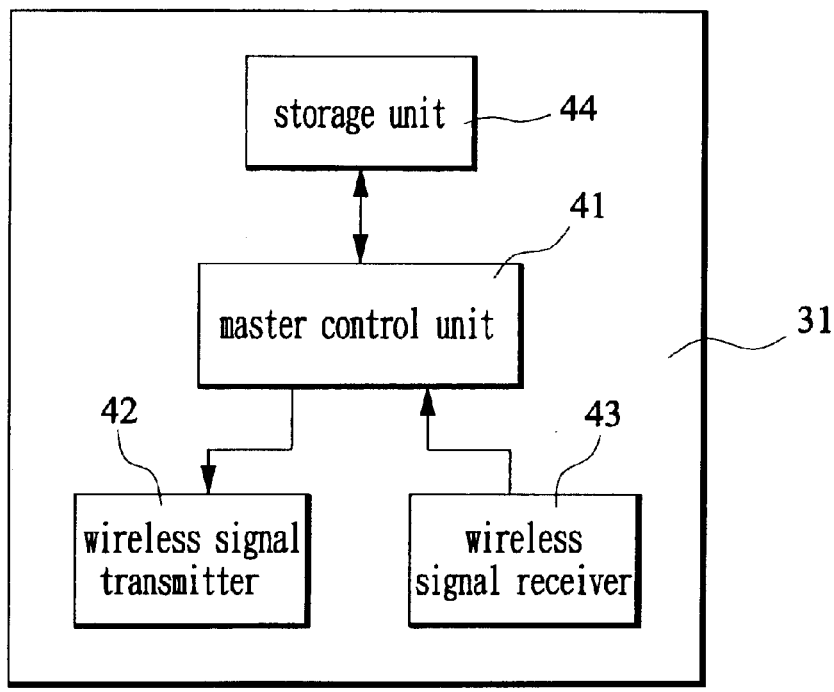
FIG. 4 is a block diagram of a wireless transmission module of the present invention.

The wireless electronic device 31 of the present invention can be an anti-theft device, a navigation device, a car status diagnosis device, a car backing supplementary, device, a mobile communication device or a central air-conditioning device. As shown in FIG. 4, the wireless transmission module 311 in the wireless electronic device 31 comprises a master control unit 41, a wireless-signal transmitter 42, and wireless signal receiver 43 and a storage unit 44. The master control unit 41 is used to control connection and data exchange between the wireless electronic device 31 and the wireless network 34. The wireless'signal transmitter 42 is connected to the master control unit 41, and is used to transmit wireless signals to the wireless network 34. The wireless signal receiver 43 is connected to the master control unit 41, and is used to receive wireless signals from the wireless network 34. The storage unit 44 is connected to the master control unit 41, and is used to store the ID code 36.

Figure 5:
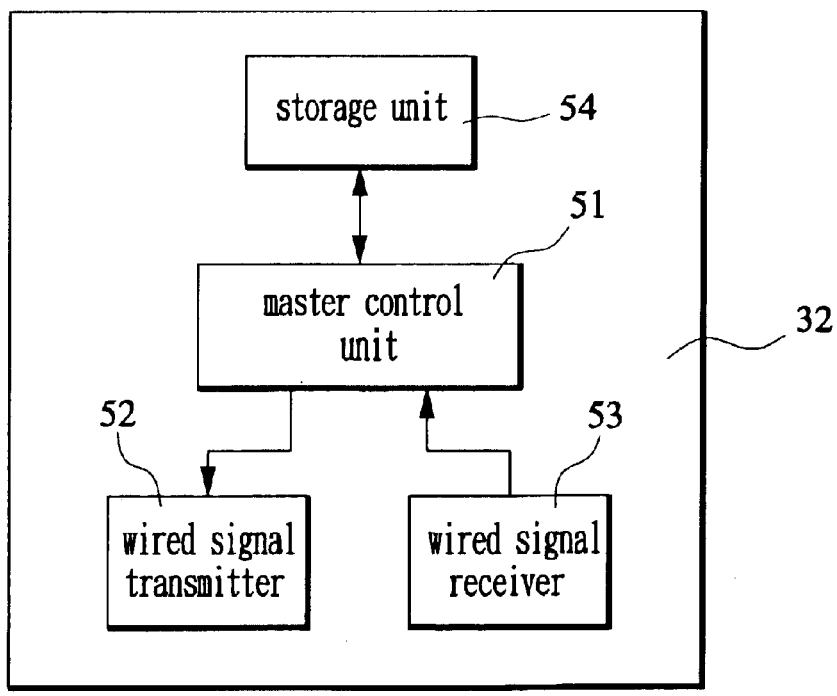
FIG. 5 is a block diagram of a wired transmission module of the present invention.

The wired electronic device 32 of the present invention can be an audio device, an anti-theft device, a navigation device, a car status diagnosis device, a car backing supplementary device, a mobile communication device or a central air-conditioning device. The audio device can also include an AM/FM radio set, a CD player, an amplifier, a sound effect equalizer and at least a speaker. As shown in FIG. 5, the wired transmission module 321 in the wired electronic device 32 comprises a master control unit 51, a wired signal transmitter 52, and wired signal receiver 53 and a storage unit 54. The master control unit 51 is used to control connection and data exchange between the wired electronic device 32 and the wired network 35. The wired signal transmitter 52 is connected to the master control unit 51, and is used to transmit wired signals to the wired network 35. The wired signal receiver 53 is connected to the master control unit 51, and is used to receive wired signals from the wired network 35. The storage unit 54 is connected to the master control unit 51, and is used to store the ID code 36.

Figure 6:
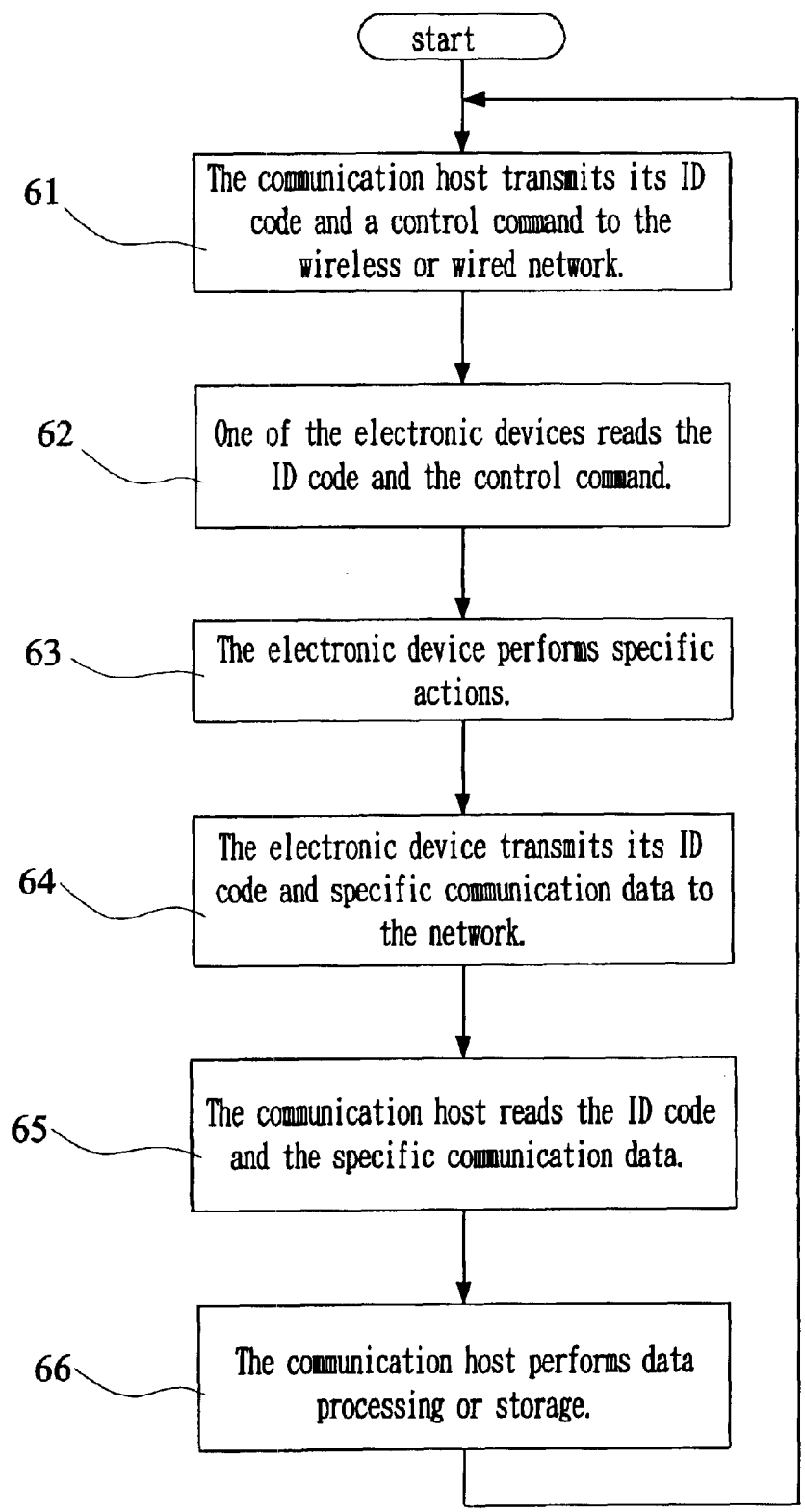
FIG. 6 is a flowchart of communication between a computer system and electronic devices of the present invention.

The present invention makes use of the communication host 33 to connect all the electronic devices 2 and to form the wireless network 34 and the wired network 35. FIG. 6 is a flowchart of communication between the computer system and the electronic devices of the present invention. First, the communication host transmits its ID code and a control command to the wireless or wired network (Step 61). One of the electronic devices reads the ID code and the control command on the network (Step 62). After the electronic device performs specific actions (Step 63), the electronic device transmits its ID code and specific communication data to the network (Step 64). The communication host then reads the ID code and the specific communication data on the network (Step 65). Next, the communication host performs data processing or storage (Step 66). Subsequently, the ID code and the control command of the communication host are transmitted to the wireless or wired network for the next control action.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A computer system for integrating car electronic devices, comprising:

a housing of standard DIN size to be installed in a car dashboard;

a computer host received in said housing and capable of running at least an operating system, a plurality of connection ports being disposed on said computer host to connect at least an electronic device, wherein said connection ports on said computer host are disposed at a rear end backboard of said computer host and wherein said connection ports include a display connection port and a display connected to said display connection port and used to display text or image information; and a touch panel, wherein said touch panel adheres to said display and is electrically connected to one of said connection ports of said computer host, data being inputted to said touch panel through contacting an image or text information displayed on said display;

a control panel disposed at a front end of said computer host and having a plurality of keys for controlling said computer host;

wherein the standard DIN size of said housing is 1DIN size or 2DIN size;

wherein said operating system run by said computer host is an open-end multitask operating system;

wherein said connection ports includes at least a serial port, at least a parallel port, at least a data communication port, and at least an audio connection port;

wherein said electronic device connected with said computer host is an audio device, an anti-theft device, a navigation device, a car status diagnosis device, a car backing supplementary device, a mobile communication device or a central air-conditioning device;

wherein said audio device includes an AM/FM radio set, a CD player, an amplifier, a sound effect equalizer and at least a speaker;

wherein said computer host comprises a bus connected to said connection ports and used for data exchange between each device, a CPU connected to said bus and used to run software programs or perform processing, operation or access of data, a memory unit connected to said bus and used to store temporarily software programs or said operating system run by said CPU, and a chipset connected to said bus and responsible for data control, access or exchange between said CPU and said memory unit and said connection ports;

wherein said memory unit comprises a random access memory unit used to temporarily store software programs and operation data and a flash memory unit used to store said operating system, a plurality of application programs and a plurality of drivers;

wherein said computer host further comprises a wireless transmission module, wherein said wireless transmission module is connected to said bus, is used to connect at least a wireless electronic device in a wireless way, and transmits or receives wireless data to and from said wireless electronic device;

wherein said wireless electronic device is an anti-theft device, a navigation device, a car status diagnosis device, a car backing supplementary device, a mobile communication device or a central air-conditioning device;

wherein said computer host further comprises a storage, wherein said storage is connected to said bus and used to access, upgrade or expand said operating system, a plurality of application programs and a plurality of drivers;

wherein said storage is a hard disk drive, a CD-ROM drive, or a memory card;

wherein a memory card slot is disposed on said control panel for insertion of a memory card;

wherein a CD-ROM drive slot is further disposed on said control panel;

wherein a USB communication port is further disposed on said control panel; and wherein an IEEE 1394 communication port is further disposed on said control panel.

2. The communication system for integrating car electronic devices as claimed in claim 1, wherein said operating system comprises at least one of Windows CE, Windows XP Embedded, and embedded Linux.

* * * * *